Jan. 12, 1926. 1,569,209
C. W. SHANABERGER
CONVEYER
Filed June 9, 1925 15 Sheets-Sheet 2
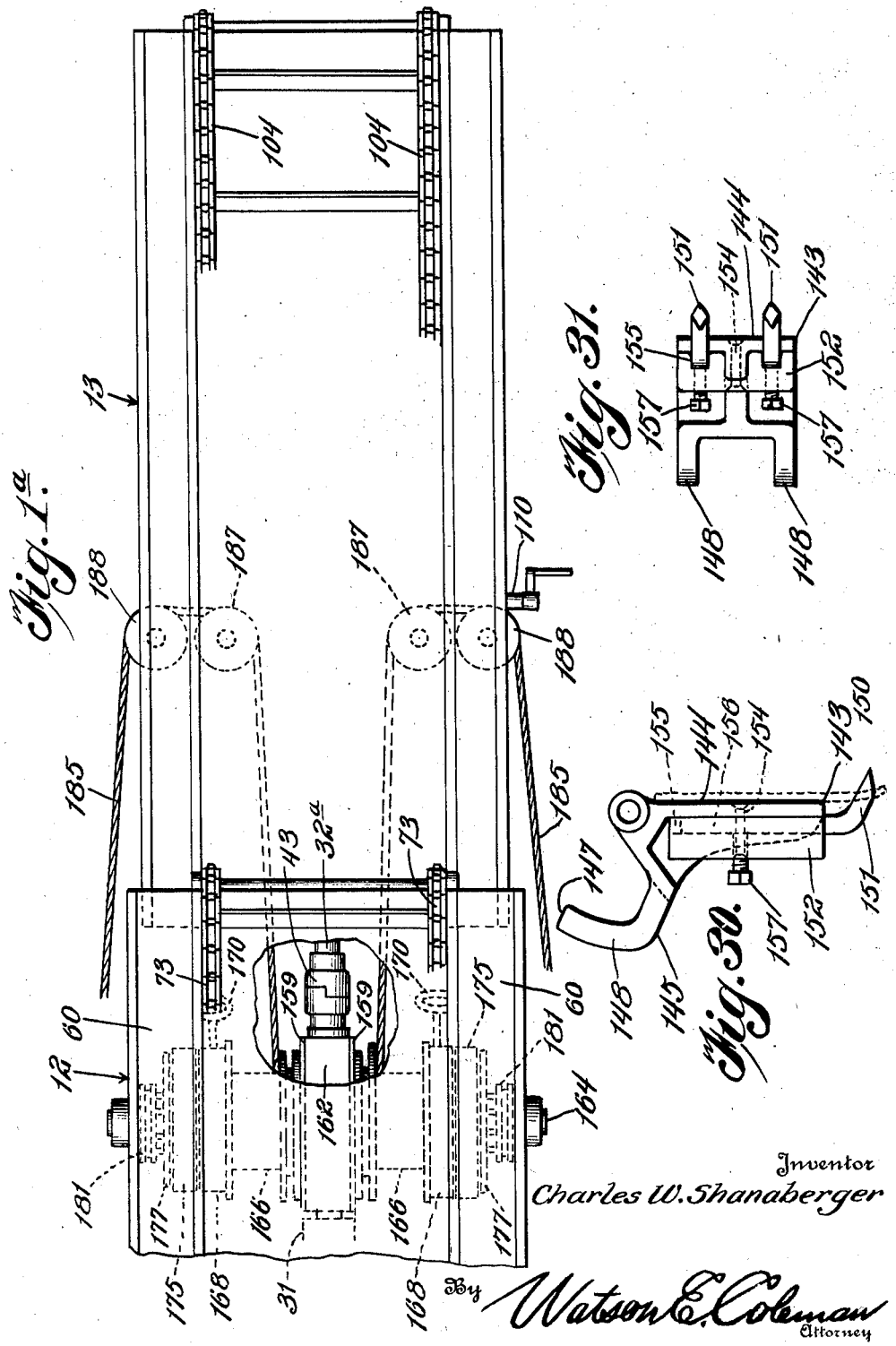

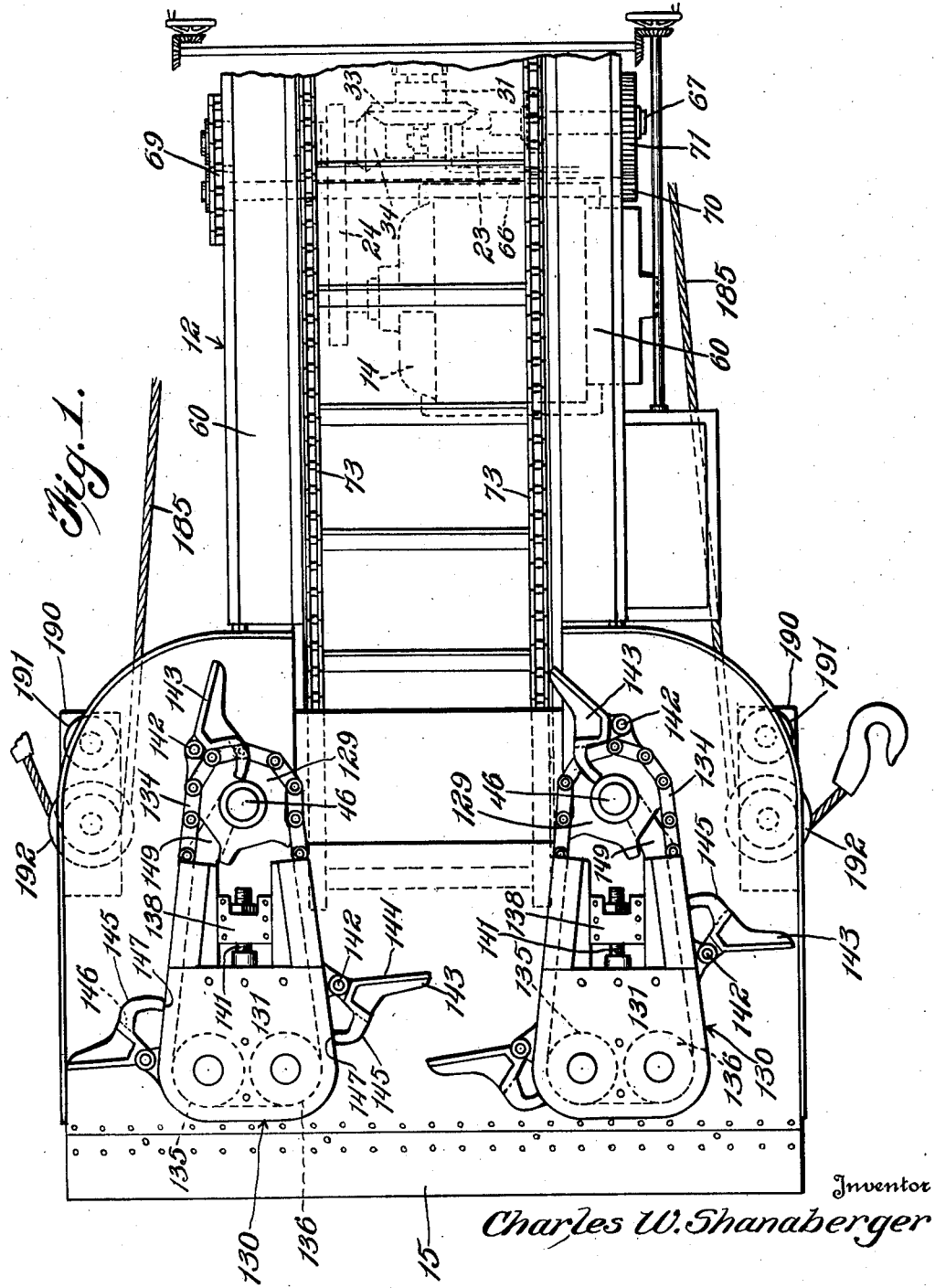

Jan. 12, 1926.
C. W. SHANABERGER
1,569,209
CONVEYER
Filed June 9, 1925      15 Sheets-Sheet 3
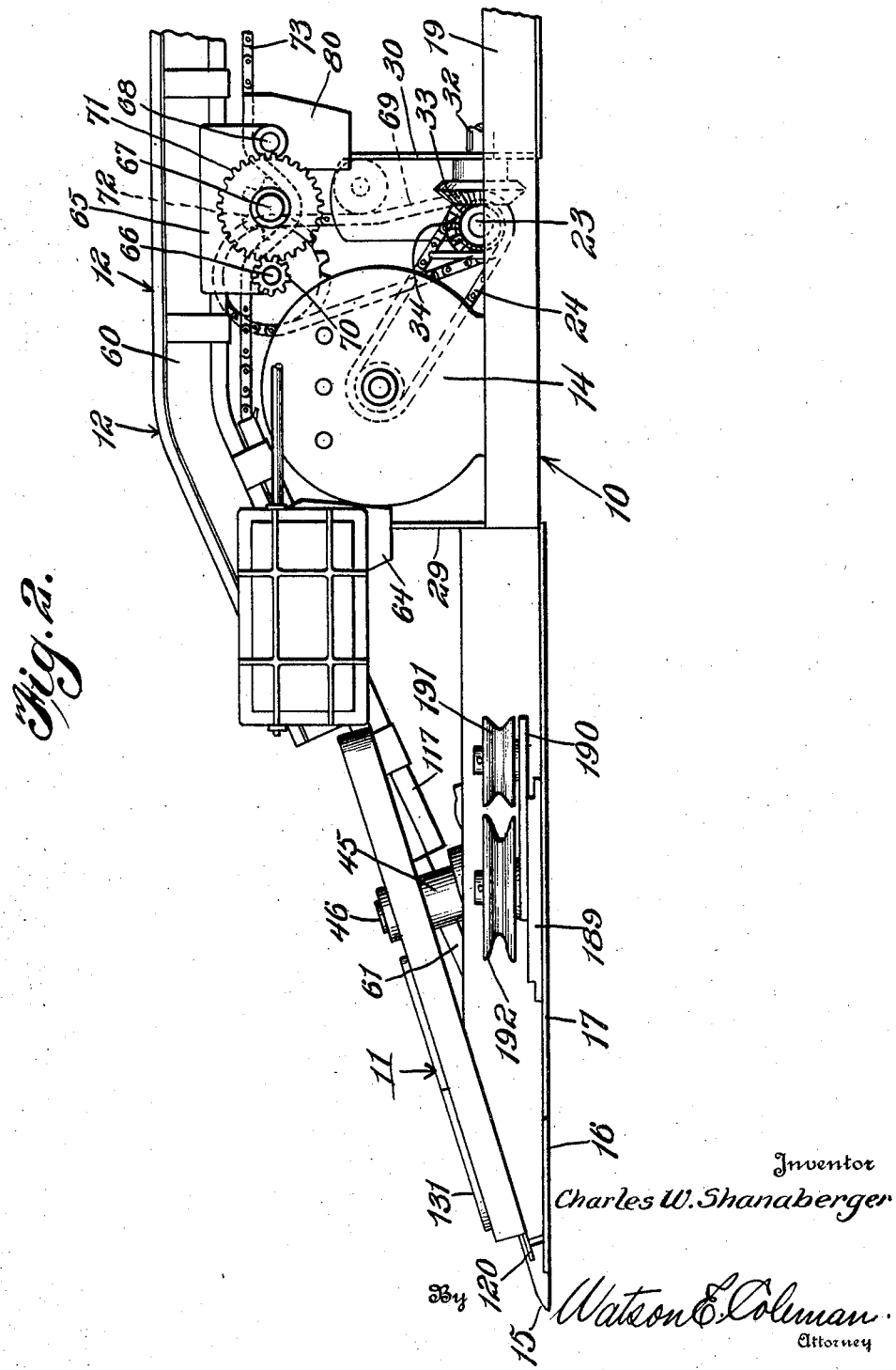
Inventor
Charles W. Shanaberger
By Watson E. Coleman
Attorney Jan. 12, 1926.  1,569,209
C. W. SHANABERGER
CONVEYER
Filed June 9, 1925   15 Sheets-Sheet 4
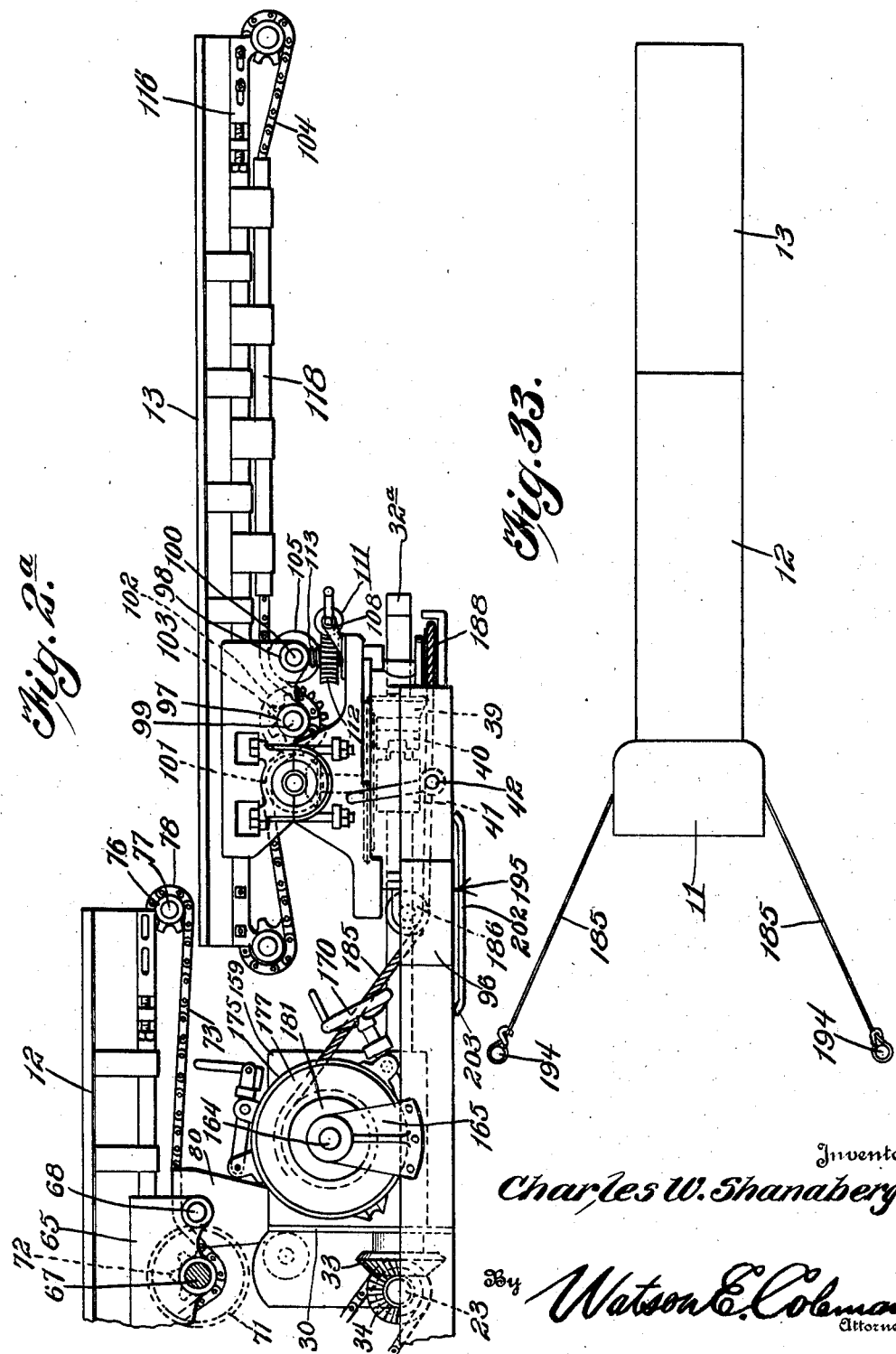

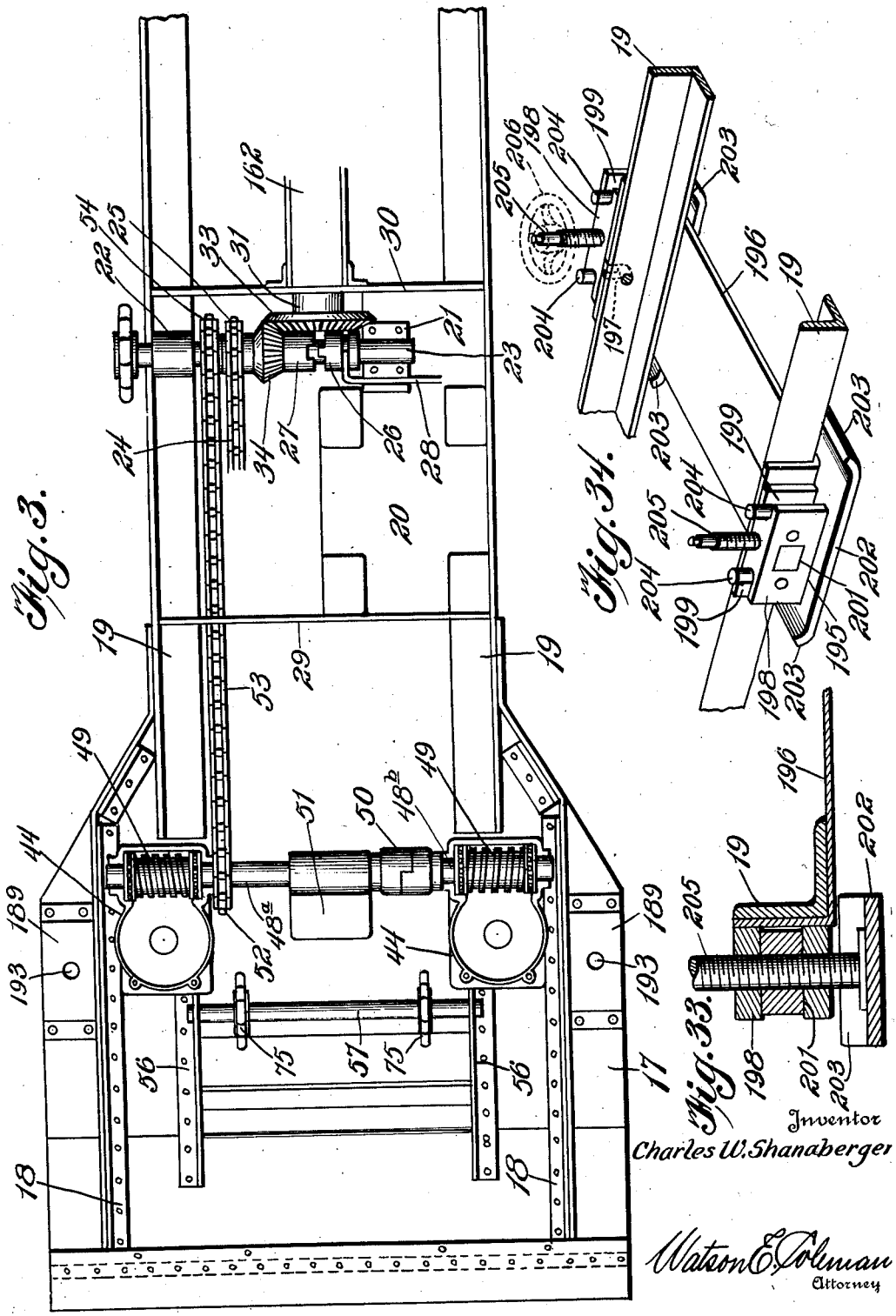

Jan. 12, 1926.　　　　　　　　　　　1,569,209
C. W. SHANABERGER
CONVEYER
Filed June 9, 1925　　　15 Sheets-Sheet 6

Inventor
Charles W. Shanaberger

By Watson E. Coleman
Attorney

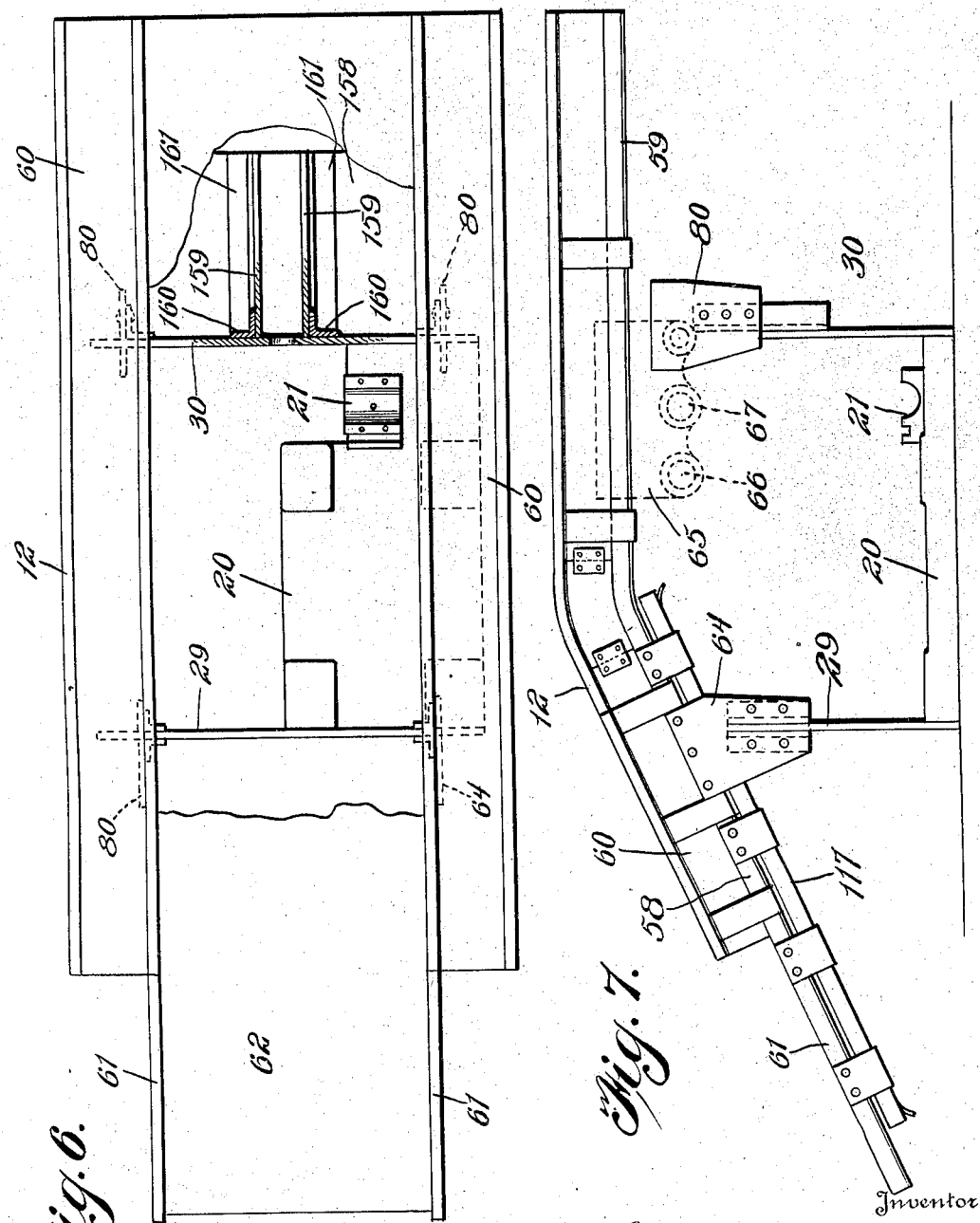

Jan. 12, 1926. 1,569,209
C. W. SHANABERGER
CONVEYER
Filed June 9, 1925 15 Sheets-Sheet 8
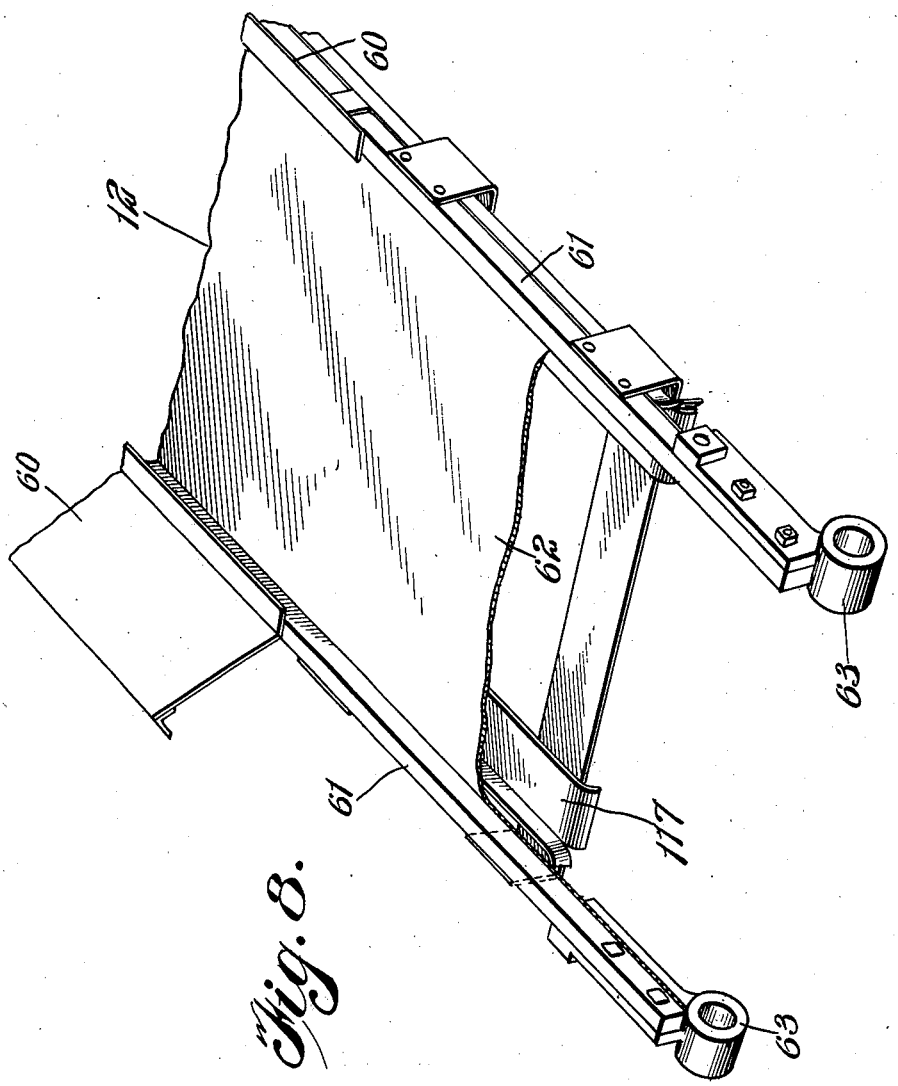
Inventor
Charles W. Shanaberger
By Watson E. Coleman
Attorney Jan. 12, 1926.
C. W. SHANABERGER
1,569,209
CONVEYER
Filed June 9, 1925   15 Sheets-Sheet 9
Fig. 9.
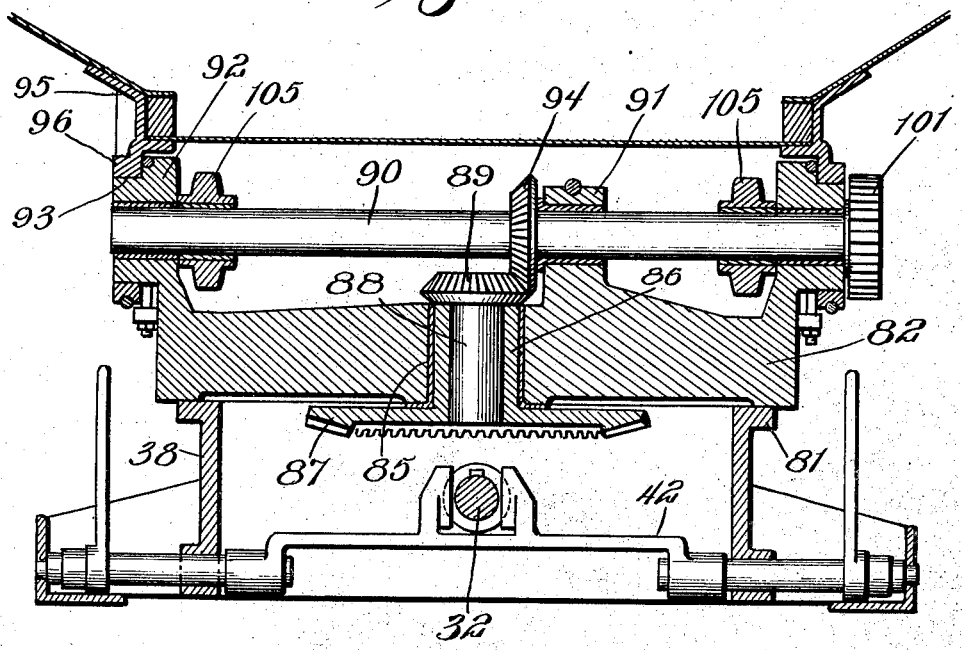
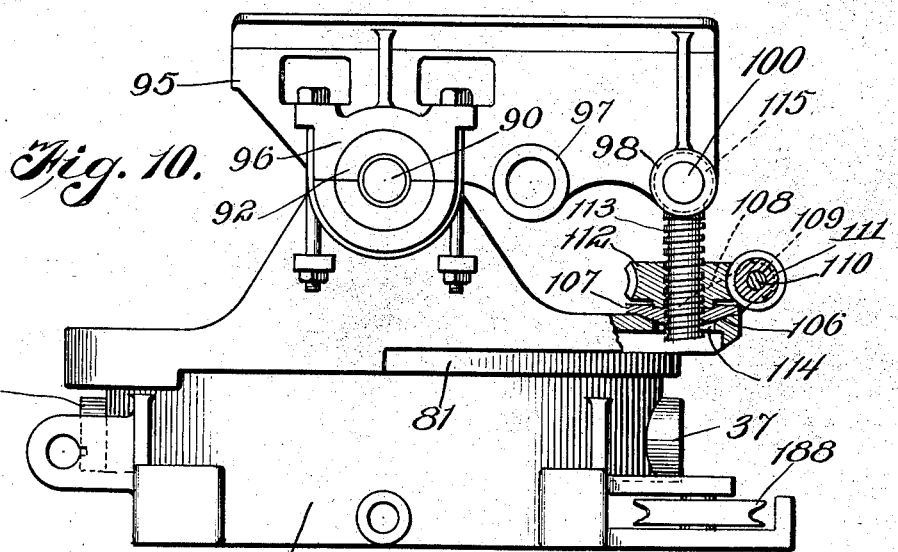
Fig. 10.
Fig. 11.
Inventor
Charles W. Shanaberger
By Watson E. Coleman
Attorney Jan. 12, 1926. 1,569,209
C. W. SHANABERGER
CONVEYER
Filed June 9, 1925 15 Sheets-Sheet 10

Inventor
Charles W. Shanaberger

By Watson E. Coleman
Attorney

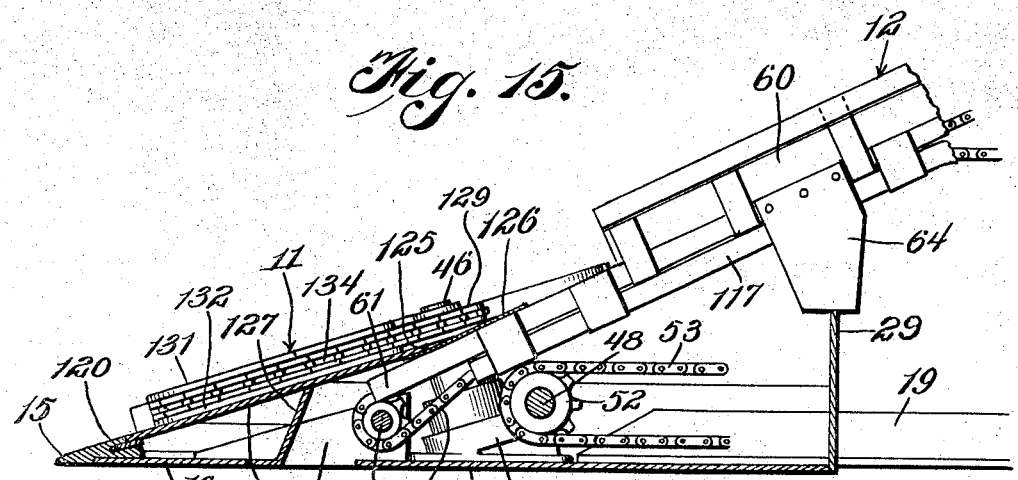
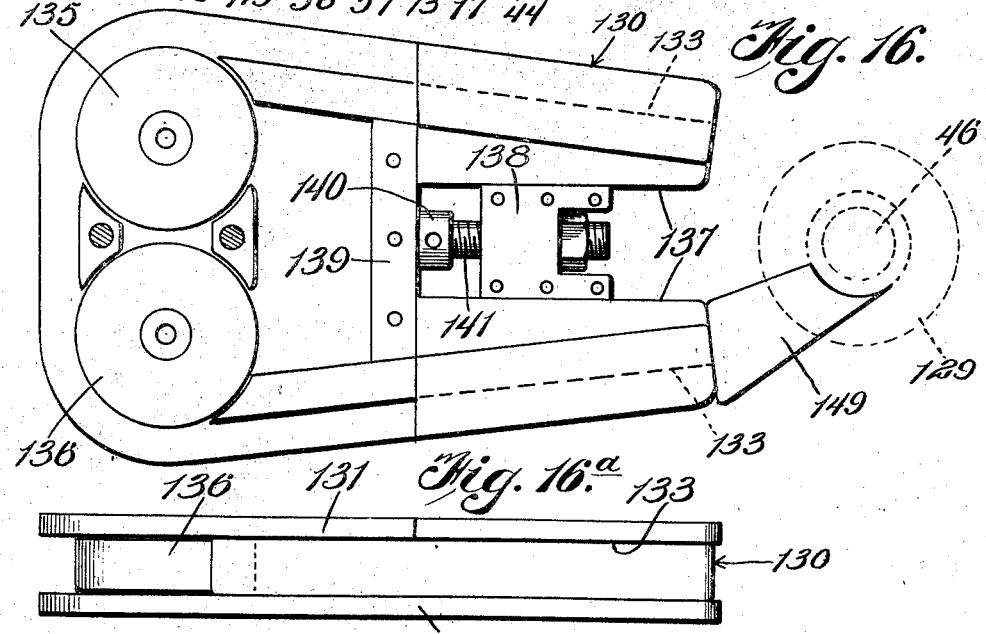

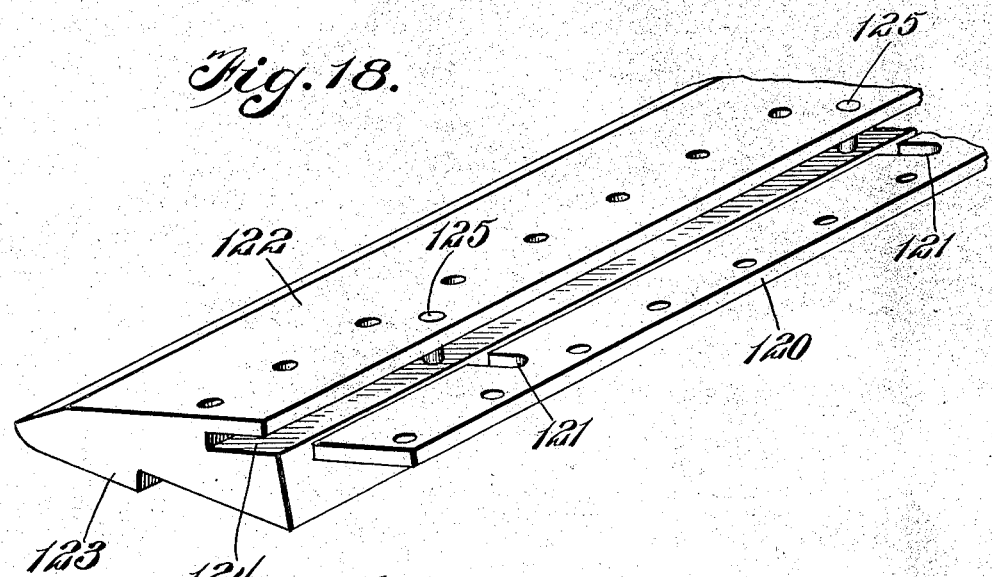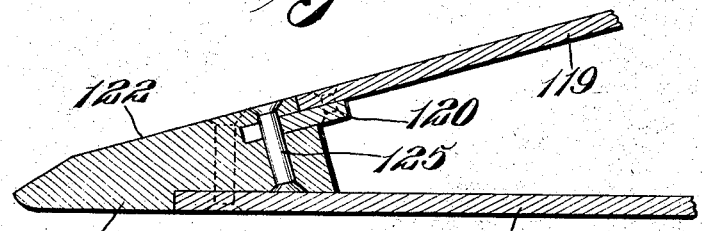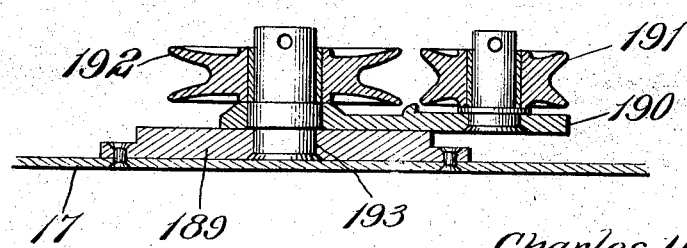

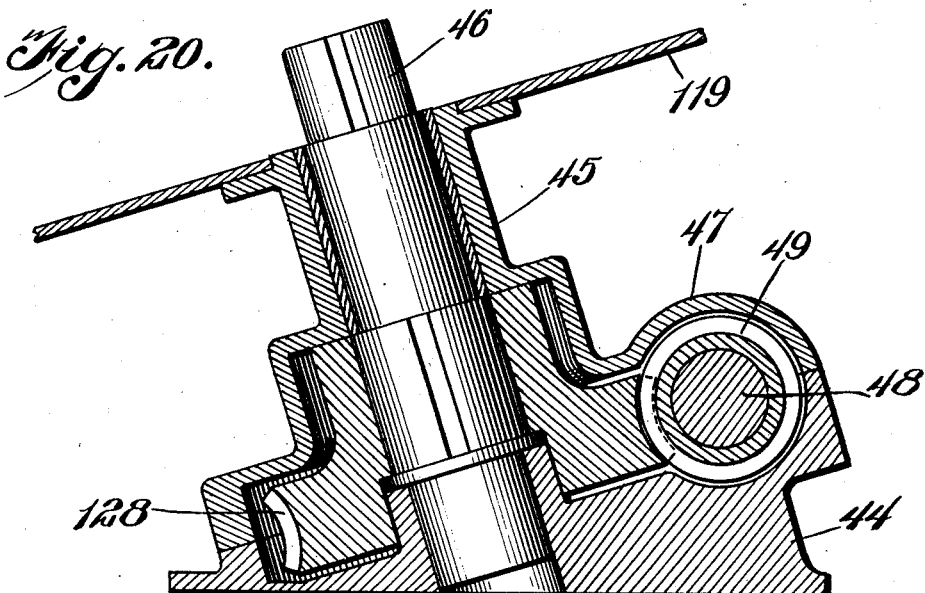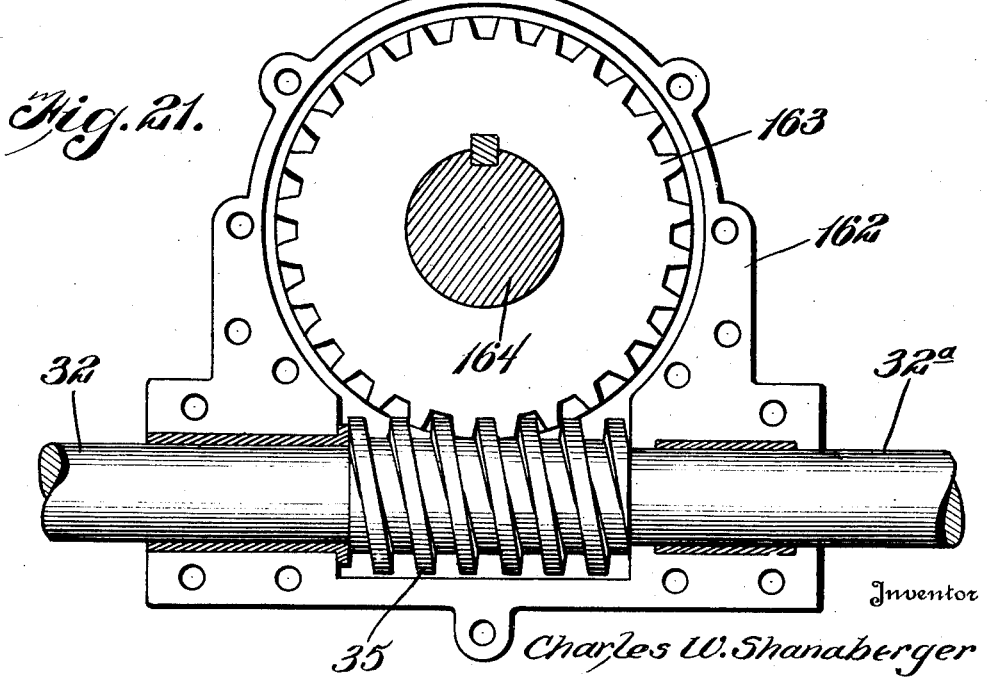

Jan. 12, 1926. 1,569,209
C. W. SHANABERGER
CONVEYER
Filed June 9, 1925 15 Sheets-Sheet 14
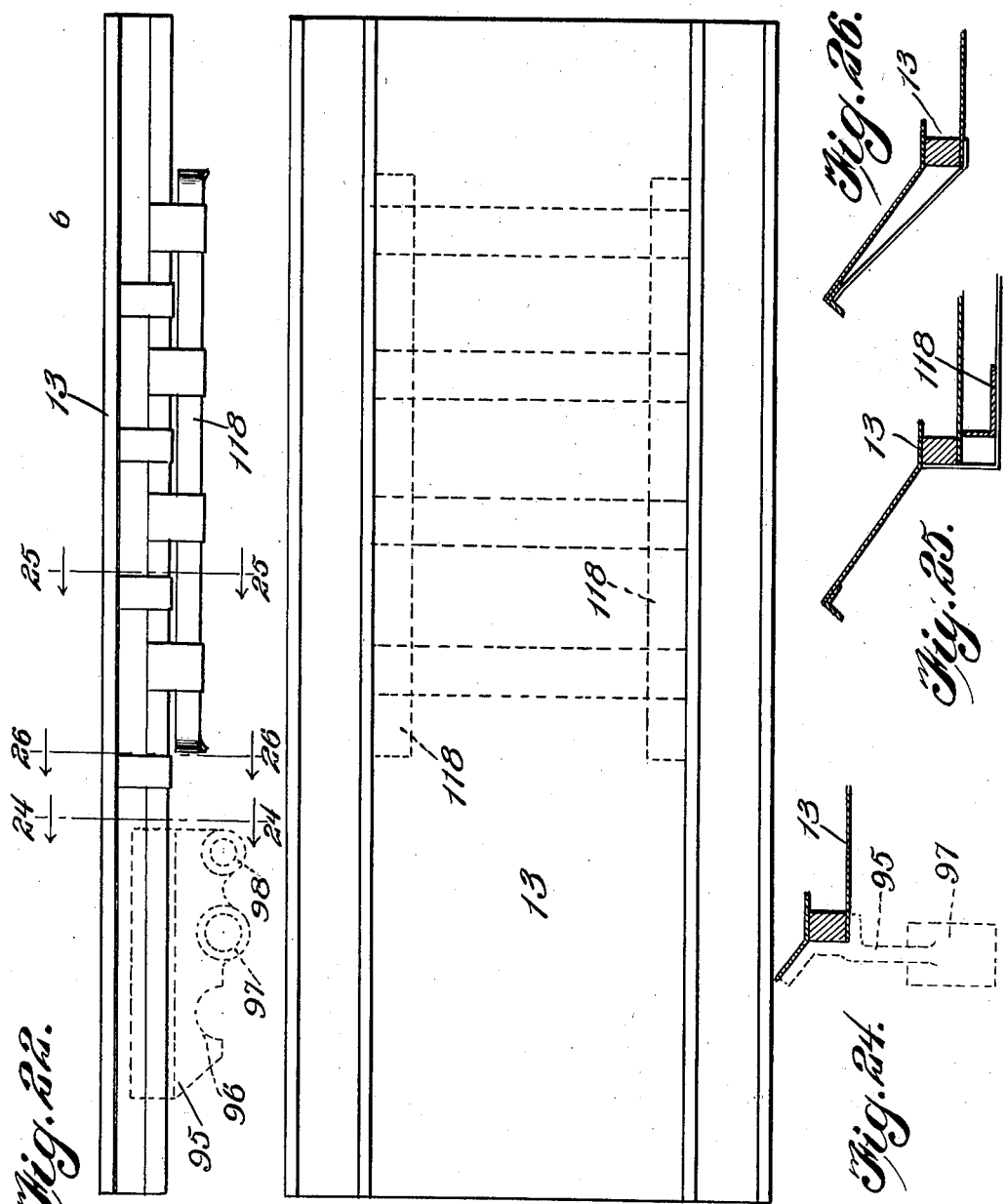

Jan. 12, 1926.   
C. W. SHANABERGER   
1,569,209
CONVEYER
Filed June 9, 1925   15 Sheets-Sheet 15
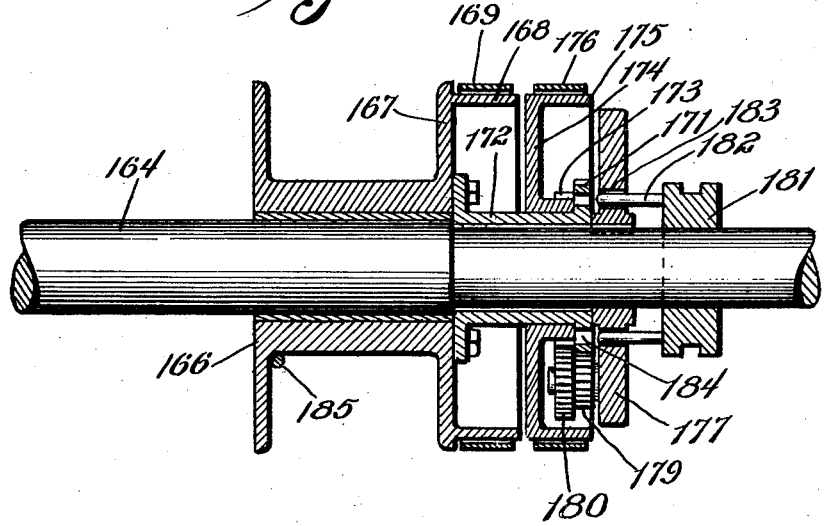
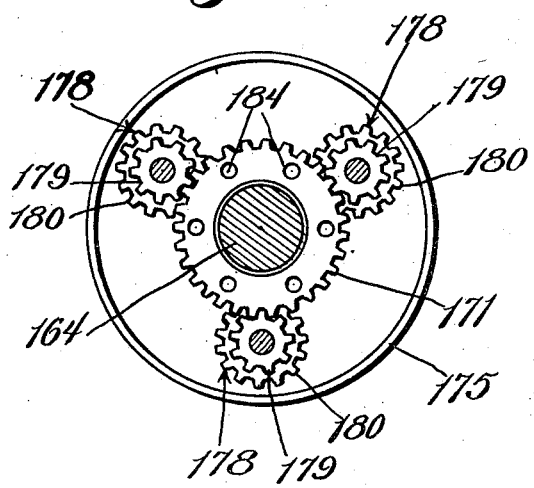
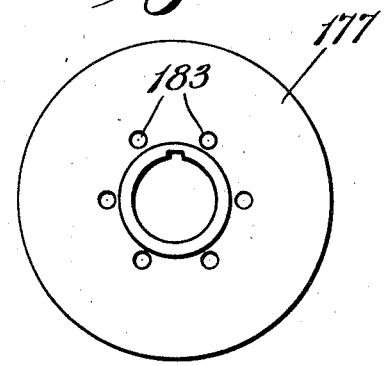
Inventor   
Charles W. Shanaberger
By Watson E. Coleman   
Attorney Patented Jan. 12, 1926.

1,569,209

UNITED STATES PATENT OFFICE.

CHARLES W. SHANABERGER, OF INDIANA, PENNSYLVANIA, ASSIGNOR OF TWO-THIRDS TO JOHN BARNES, OF PHILADELPHIA, PENNSYLVANIA.

CONVEYER.

Application filed June 9, 1925. Serial No. 36,034.

*To all whom it may concern:*

Be it known that I, CHARLES W. SHANABERGER, a citizen of the United States, residing at Indiana, in the county of Indiana and State of Pennsylvania, have invented certain new and useful Improvements in Conveyers, of which the following is a specification, reference being had to the accompanying drawings.

This invention relates to conveyers and has for a particular object thereof the provision of a coal loading conveyer capable of use in low seam coal loading where the height of the seam is such that any conveyer employed must be extremely low and flatly constructed.

Another object of the invention is to provide a device of this character in which the loading apparatus forming a portion of the conveyer is extremely flexible and may be readily adjusted to deliver coal to various heights or to various angles with relation to the remainder of the machine.

A still further object of the invention is the provision of a novel and improved conveyer loading mechanism whereby the coal is loaded upon the forward end of the conveying mechanism proper.

A more specific object of the invention is the provision of a novel and improved adjustable conveyer mounting of such character that the conveyer may be readily rotated about a fixed horizontal axis and upon a corresponding vertical axis.

A still further object of the invention is an improvement of the construction of the conveyer elements proper to provide a drive therefor and mountings for the drive such that this drive may be employed to support the conveyer and thereby eliminating the necessity for additional supports and accordingly a considerable amount of weight.

A still further object of the invention is the provision of means whereby the machine may be bodily shifted and its movements governed so that it may be moved into coal to load the same.

The invention further resides in the various details of construction employed, as shown in the accompanying drawings, wherein:—

Figure 1 is a top plan view of the forward end of a conveyer constructed in accordance with my invention;

Figure 1ª is a plan view of the rear end of this conveyer;

Figure 2 is a side elevation of the forward end of a conveyer constructed in accordance with my invention;

Figure 2ª is a side elevation of the rear end thereof;

Figure 3 is a plan of the base of the machine and the associated mechanism;

Figure 6 is a plan of the middle conveyer structure, portions being broken away to show the motor deck plate and the supporting plates for the middle conveyer;

Figure 7 is a side elevation of the middle conveyer structure and its supports;

Figure 8 is a perspective of the forward end of the middle conveyer;

Figure 9 is a vertical sectional view through the turntable structure supporting the rear conveyer;

Figure 10 is a side elevation partially in section of the turntable structure;

Figure 11 is an end elevation of a bearing of the turntable structure;

Figure 15 is a longitudinal sectional view through the shovel showing the connections of the forward ends of the middle conveyer therewith;

Figure 16 is a plan view of the guide mechanism for the shovel conveyers;

Figure 16ª is a side elevation of the guide;

Figure 17 is a sectional view through the guide showing the mounting of the rollers;

Figure 18 is an enlarged perspective of the shoe of the shovel and the guide plate employed for connecting the upper shovel plate thereto;

Figure 19 is a sectional view through the shoe and the adjacent portions of the guide plate and upper and lower plates of the shovel;

Figure 20 is a vertical sectional view through the drive mounting of the shovel conveyers;

Figure 21 is a view with the upper section of the housing removed, the drive shaft being shown in section;

Figure 22 is a side elevation of the rear conveyer;

Figure 23 is a plan view thereof;

Figures 24, 25 and 26 are sections on the lines 24—24, 25—25 and 26—26 of Figure 22;

Figure 27 is a longitudinal sectional view through one of the rope drums and the mechanism for controlling the same;

Figure 28 is a vertical sectional view showing the planetary transmission mechanism;

Figure 29 is an end elevation of the shaft attached and of the rope drum control;

Figure 30 is a plan view of one of the scraper arms of the shovel conveyer mechanism having applied thereto cutting bits;

Figure 31 is an end elevation of the scraper arms shown in Figure 30;

Figure 32 is a vertical sectional view through the sheave plate mounting on the shovel conveyer;

Figure 33 is a plan view partially diagrammatic showing one manner of connecting the jack posts to the cables of the machine to shift the machine;

Figure 34 is a perspective view of the jack mehanism employed for hoisting the rear end of the conveyer when operating upon uneven surfaces; and Figure 35 is a detailed section taken through one of the jack elements.

Figure 4:
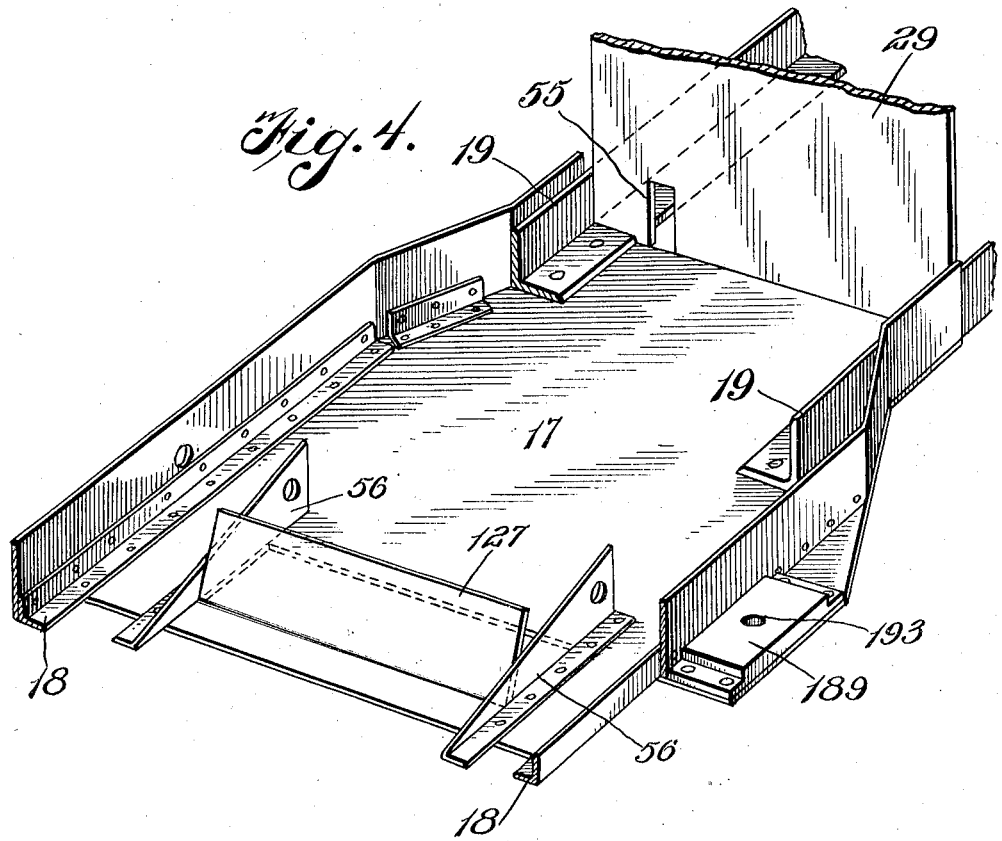
Figure 4 is a perspective of the shovel base plate and the associated attached parts.
Figure 5:
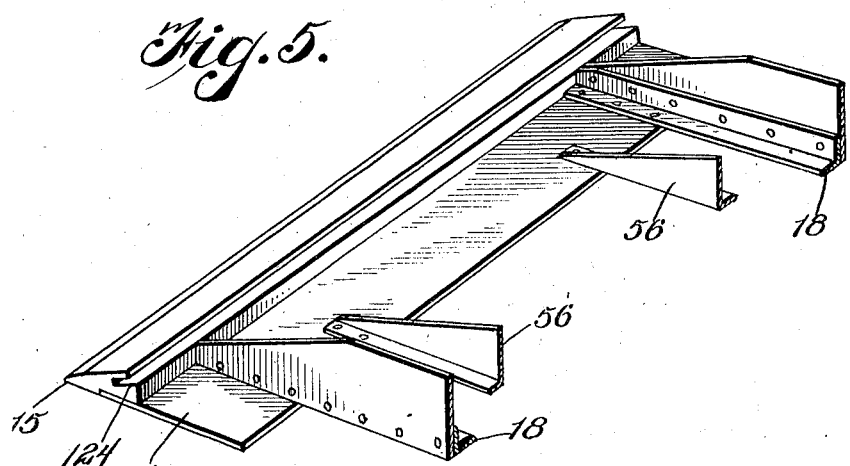
Figure 5 is a perspective of the shoe of the shovel and its attached parts.
Figure 12:
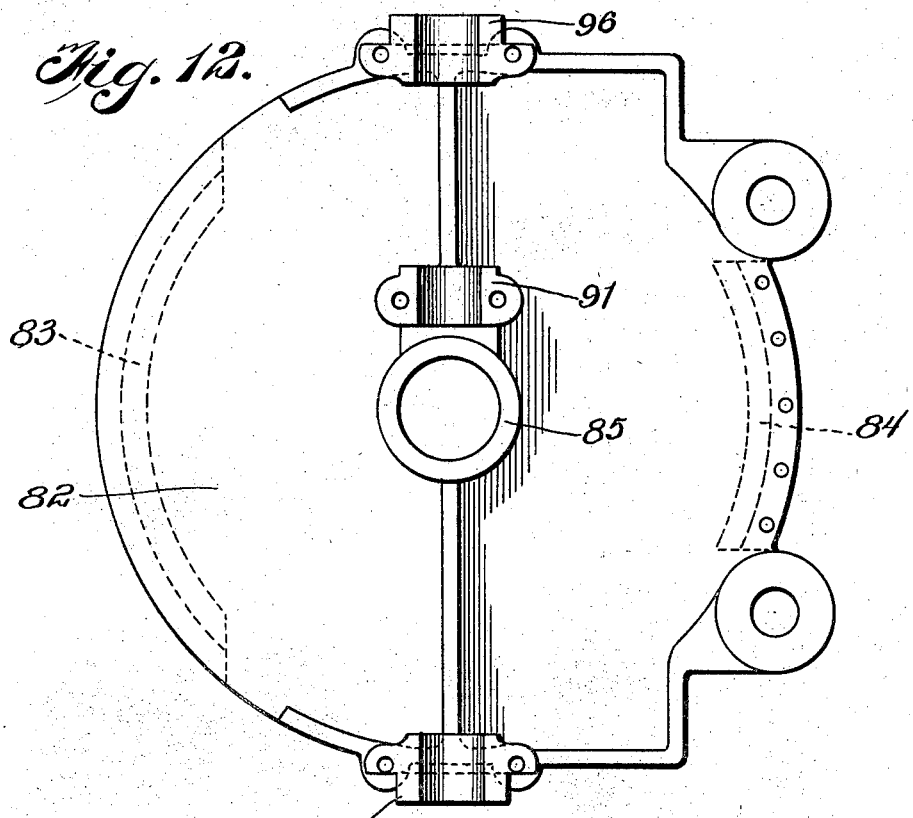
Figure 12 is a plan view of the turntable element.
Figure 13:
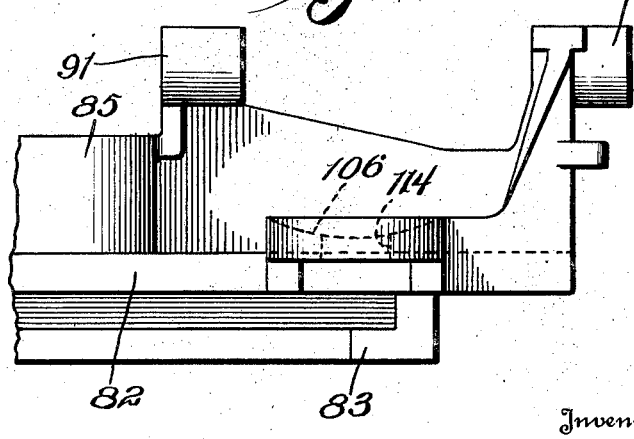
Figure 13 is a fragmentary end elevation thereof.
Figure 14:
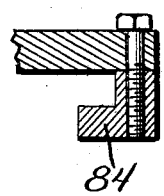
Figure 14 is a detailed sectional view showing the detachable gear.

Referring now more particularly to the drawings, the loading apparatus includes a base, generally designated at 10, upon which are mounted a forward or loading conveyer structure 11, a central conveyer structure 12 and a rear conveyer structure 13 together with a common drive comprising a motor 14 for all of said conveyers and, as will hereinafter more fully appear, for the mechanism for bodily shifting the entire machine. The base 10, which is more particularly illustrated in Figure 3, has at its forward end a shoe 15 as more clearly shown in Figures 18 and 19. This shoe is notched at its under surface for the reception of the forward edge of a base plate 16 extending the entire width of the shoe and rigidly secured thereto. The rear edge of the shoe attached plate 16 is engaged by the forward edge of a bottom shovel plate 17 (Figures 4 and 5) and is rigidly secured thereto by angle irons 18 which are riveted to each of the plates. To the rear end of the shovel base plate 17 are secured a pair of parallel angle irons 19 forming side frames for the base. At the rear end of the shovel base plate 17 to one of the angle irons 19 is secured a motor deck plate 20 (Figures 6 and 7) upon which the motor 14 is mounted. This motor deck plate and the opposite angle iron 19 have mounted thereon bearings 21 and 22 for the reception of a counter-shaft 23 which is driven from the motor by a sprocket chain 24 (Figure 3). This sprocket chain engages the sprocket of a combined sprocket and bevel gear unit 25 rotatably mounted upon the shaft 23. Splined upon the shaft 23 is a clutch jaw 26 coacting with the clutch jaw 27 formed upon the combined sprocket and bevel gear unit and shiftable through a fork 28 to connect or disconnect this unit.

The front and rear walls of the motor deck plate have secured thereto vertical plates 29 and 30 (Figures 6 and 7), hereinafter referred to as front and rear support plates, respectively. The rear support plate 30 has secured thereto a bearing 31 in which is mounted the forward end of a line shaft 32 extending longitudinally of the rear end of the frame and at the center thereof. The forward end of this shaft has secured thereto a bevel gear 33 meshing with the pinion 34 of the sprocket and pinion unit 25. Immediately to the rear of the rear supporting plate, the line shaft 32 has secured thereto a worm 35 (Figure 21) which is suitably thrust collared to prevent longitudinal movement thereof. The rear end of the line shaft 32 extends through bearings 36 and 37 formed at the forward and rear ends respectively of a turntable base 38 which is rigidly secured to the angle irons 19 and joins the rear ends thereof. Within the turntable base, the line shaft has splined thereto a bevel pinion 39 (Figures 2ª and 9) having a jaw clutch 40 coacting with a jaw clutch 41 splined to the line shaft 32 and operable through a shifter 42 from either side of the machine. The line shaft 32 is formed in two sections 32ª and 33ª, these sections being the forward and rear sections of the line shaft respectively. The division in the line shaft occurs rearwardly of the worm 35 and the sections are joined by a flexible coupling 43, at present indicated as being of the jaw type. The worm 35, hereinbefore described, provides a take-off for a drive for the shifting control mechanism, hereinafter to be more fully described.

Upon the shovel base plate 17 are secured a pair of bearing units 44 (Figures 20 and 21), each providing a bearing 45 for a forwardly and upwardly inclining shaft 46 and a bearing and worm housing 47 for a shaft 48 having at each end thereof a worm 49 (Figure 3). The shaft 48 is formed in two sections 48ª and 48ᵇ connected by a flexible coupling 50 arranged adjacent one of the worm housings 47. At the approximate center of the plate 17, a bearing 51 is provided for the inner end of the shaft section 48ª and between this bearing and the end thereof engaged in the worm housing 49, the shaft section 48ª has secured thereto a sprocket 52 connected by a chain 53 with a sprocket 54 secured to the counter-shaft 23, this chain passing through a slot 55 formed in the forward support plate 29. Secured to the front plate 16 and the shovel base plate 17 are a pair of gussets 56 embodying vertical flanges in which are mounted the ends of a transversely extending stationary shaft 57.

The middle conveyer 12 (Figures 6 to 8) has an inclining portion 58 and a horizontal portion 59. A portion of the incline 58 and the entire horizontal section are provided with upwardly diverging retaining walls 60 while the forward lower end of the inclining portion consists simply of side bars 61 and a bottom plate 62 secured to these side bars. At their forward ends, the side bars 61 have secured thereto supporting yokes 63, the outer faces of which fit between adjacent faces of the gussets 56 and embrace the shaft 57. By this means, the forward end of the central conveyer is rigidly supported, being held both against vertical and transverse movement. The upper end of the inclined section 58 is rigidly secured to the front support plate 29 by gussets 64.

Rigidly secured to opposite sides of the horizontal section 59 of the central conveyer 12 are power brackets 65 (Figure 2), each having bearings for the reception of three shafts 66, 67 and 68. These shafts are substantially horizontally aligned and the shaft 66 is driven from the counter-shaft 23 by a chain drive 69. Corresponding ends of the shafts 66, 67, have secured thereto a pinion 70 and a gear 71. Inwardly of the power bracket 65, the shaft 67 has secured thereto sprockets 72 engaging chains 73 of the conveyer. Upon the shafts 66 and 68, in alignment with these sprockets, are arranged idler rollers 74 over which the chain passes, this chain being passed over one roller under the sprocket and then over the second roller of the three shafts. Upon the shaft 57 are arranged idler sprockets 75 over which the conveyer chains pass. At the rear end of the horizontal section 59, adjustable yokes 76 are mounted having arranged therein a shaft 77 having idler rollers 78 about which the chain passes. These chains will, of course, be provided with suitable flights 79 of any desired construction. The shaft 68 is stationary and immediately inwardly of the power bracket 65 passes through openings formed in gusset plates 80 rigidly secured to the rear support plates 30. It will be observed that the necessary idler shafts of the central conveyer have been brought into play as a means for providing a support for this conveyer and it will likewise be noted that the support plates 29 and 30 together with the actual conveyer structure combine to form a housing for the motor 14. The total elevation provided for the horizontal section of the middle conveyer will be just sufficient to provide the necessary clearance for the motor. This structure so compacts the drive and conveyer structure that the over all height of the machine actually produced from the bottom of the base plate to the top of the retaining walls 60 is but thirty inches, thus allowing ample overhead clearance in operating in a low coal seam.

The rear conveyer 13 is supported from a turntable structure (Figures 9 to 14), the base 38 of which has been previously mentioned. This base which is rigidly secured to the angle irons 19 has at its upper end an outstanding circular flange 81 upon which is seated the rotatable portion 82 of the turntable structure. This plate has diametrically opposed gibs 83 and 84 engaging beneath the flange 81 securing the rotatable structure thereto. The gib 83 is fixed while the gib 84 is removably mounted so that the sections of the turntable may be readily separated for convenience in replacement or repair. The rotatable structure of the turntable has an axial bushed vertical opening 85 through which is directed the hub 86 of a bevel gear 87 which meshes with the pinion 39 of the line shaft 32. This hub has a central bore receiving the shaft 88 of a bevel gear 89 and this shaft is keyed to the hub of the gear. Extending diametrically of the upper rotatable portion and upon the upper face thereof is a shaft 90 having a central bearing 91 and out-bearings 92. These out-bearings 92 have the outer ends of the caps thereof finished, as at 93, to provide axes for vertical adjustment of the free end of the rear conveyer 13. Upon this shaft adjacent the central bearing and meshing with the gear 89 is a bevel gear 94 providing a drive for the shaft.

The rear conveyer (Figures 22 to 26) includes a pair of power brackets 95, each having a bearing 96, these bearings receiving the finished outer end 93 of the out-bearings 92 and bearings 97 and 98 receiving shafts 99 and 100. The shafts 90 and 99 project at one side of the machine and have mounted thereon a pinion 101 and gear 102 respectively, so that the shaft 99 is driven from the shaft 90. This shaft 99 has secured thereto drive sprockets 103 engaging the chains 104 of the rear conveyer. Each of the shafts 90 and 100 is provided with idler rollers 105 about which the chains 104 pass, the engagement of the chains with the sprockets and rollers being similar to the engagement previously described in connection with the intermediate conveyer.

The upper surface of the rear rotatable structure 82 of the turntable is provided with arcuately dished sockets 106 (Figure 20) in which is seated bearings 107 having projecting rearwardly and upwardly therefrom arms 108 having bearings at their outer ends, as indicated at 109 for a manually operated shaft 110 to which is secured worms 111. Seated upon the bearings 107 are worm gears 112 having an axial worm threaded opening through which is directed a worm 113 having its lower end directed through an opening formed in the bearing 107 and through enlarged openings 114 formed in the upper turntable structure so that the lower end of this shaft may move with relation to the structure. The upper ends of the worms 113 are each provided with yokes 115 embracing the shaft 100. The structure just described provides means for vertically adjusting the rear end of the rear conveyer 13 and, as will be obvious, a means for supporting the rear or otherwise unsupported end of this conveyer. It will be obvious that the rear conveyer may be readily shifted upon its turntable base and that in any of its shifted positions may have this free end vertically adjusted about the bearings 19 as an axis without in any manner impairing the support afforded for this end. At the ends of the rear conveyer 13, suitable idlers are provided as in the case of the central conveyer, one of these idlers indicated at 116, being adjustable to take up slack in the chain. It will, of course, be obvious that each of the central and rear conveyers are provided with the usual return flight guides, generally designated at 117 and 118 respectively on these conveyers.

The shovel at the forward end of the machine (Figures 1 and 15) includes an upper plate 119 forming a base for the forward or loading conveyer. This plate has attached to its forward edge an aligning plate 120, the forward edge of which is provided with spaced notches 121. The shoe (Figures 18 and 19), the upper surface 122 of which diverges from its flat lower face 123, has formed therein in its rear edge a channel 124 paralleling this upper surface and spaced from the upper surface a distance equal to the thickness of the upper shoe plate 119. Mounted in the shoe and intersecting this channel 124 are pins 125 corresponding in number and arrangement to the notches 121 and entering these notches as the aligning plate 120 enters the channel 124 so that the aligning plate and the forward edge of the shoe plate 119 are held against transverse movement with relation to the shoe. Escape of this aligning plate from the channel is prevented by the upper ends of the bearing units 44 which are rigidly bolted thereto. This upper shoe plate inclines upward and rearwardly and extends over the forward lower end of the inclined portion of the middle conveyer 12. The angle of the middle conveyer is slightly greater than the angle of the upper shoe plate and the rear edge of the shoe plate is centrally notched, as at 125, to provide for the passage of this upper conveyer. At this notch, the plate 119 has secured thereto a bib 126 having the same angle as the upper conveyer and projecting upwardly over the surface of the conveyer so that material fed to the forward end of the middle conveyer does not engage with the middle conveyer until it has passed well up upon the inclined portion of the conveyer and accordingly is withheld from spilling to the forward end of the conveyer. Since a certain portion of the material will spill to the forward end of the conveyer and since occasionally, on all such conveyers, it is necessary to reverse the direction of motion of the conveyer to relieve congestion, the bottom plate 17 between the gussets 56 has an opening formed therein by cutting away a portion of the material at its rear and side edges and then bending the flap 127 so formed until it engages the upper surface of the upper plate. Thus means are provided for preventing packing of the material in the forward end of the shoe and for permitting this material to escape and pass beneath the machine.

The front conveyer (Figures 1, 15 and 16) in reality comprises two conveyers arranged upon opposite sides of the center of the shovel and operating to deliver material to the center of the machine and through the notch 125. Each conveyer section of the forward conveyer includes a drive shaft 46 hereinbefore mentioned, to the lower end of which is secured a worm gear 128 meshing with the corresponding worm 49 of the shaft 48. The upper ends of these drive shafts project above the upper surface of the plate 119 and have secured thereto hand sprockets 129. Each conveyer unit further includes an adjustable guiding element 130 including upper and lower plates 131 and 132. The sides of these plates converge toward the hand sprocket and the lower plate has formed in its sides at its rear ends grooves 133 for guiding sprocket chains 134 operating about the associated sprocket. At is forward end, the lower plate provides a mounting for idler rollers 135 and 136, these rollers being removable upon removal of the upper plate 131 and forming with the plates a continuation of the guiding groove for the chain. The rear end of the lower plate is bifurcated and the opposed arm portions thus provided form slides 137 engaging a guide and thrust block 138 rigidly secured to the plate 119. At the inner end of the furcation, a thrust block 139 is secured between the upper and lower plates and is abutted by the head 140 of an adjusting screw 141 threaded through the combined thrust and guide block 138. Means is thus provided for adjusting the plates 131, 132 and their idler rollers mounted therein to take up any slack occurring in the chains 134.

Secured to each of the chains 134 at spaced intervals are special links providing pivots 142 for scraper arms 143 (Figures 30 and 31). Each scraper arm 143 has an outstanding flat front face 144 disposed at right angles to the plate and providing a pick-up or flight. Each scraper arm further includes a tail portion 145 which is arcuately curved and of greater width than the chains 134. This tail is provided with a notch 146, the base of which is arranged at an angle of 45° to the flat front face 144 of the arm and this notch is of a width permitting the passage of the chain 134 therethrough. When the chain is passing about that portion of the conveyer provided by the edges of the plates 131, 132, the end surfaces 147 of the arms 148 formed by slotting the tail, bear against the edges of these plates and support the scraper arms with the faces 144 thereof at right angles to the line of travel of the chain. When, however, the surfaces 147 leave the edges of the plates 131, 132, the arms are permitted to drop back through an angle of 45° or until the bases of the notches 146 come into engagement with the chains. As the links bearing the scraper arms pass about the sprocket, the surfaces 147 engage against the hubs of the sprocket to provide a support for the links. Between the hub of this sprocket and the adjacent edge of the guide at that side of each conveyer unit where the flights are leaving the sprocket, guides 14ª are provided providing a bevel slope camming the tail of the scraper arm outwardly so that the scraper arm is properly positioned to engage against the guide plates 131, 132 when it comes into opposition thereto. The plates 131, 132 will, of course, be secured in their adjusted positions upon the plate 119 in some suitable manner. While the general structure of the scraper arms above described will be adhered to, it will, of course, be understood that these arms will be modified considerably to meet different requirements. If desired, the front face of the arm may have attached thereto an extension such as generally designated at 150. On other occasions, it is found desirable to apply to these arms a structure whereby coal bits 151 may be attached to the arms. Such a structure I have illustrated in Figures 30 and 31 and consists of a plate 152 rigidly secured to the rear face of the arm 143 as, for example, by riveting, as at 154. This plate has in its forward face channels 155 combining with the rear face of the arm 143 to produce sockets for the reception of the shanks 156 of the bits. Through the rear face of the plate 153, set-screws 157 may be directed for holding the coal bits in position in these sockets.

Extending beneath and connecting the angle irons 19 immediately rearwardly of the motor deck plate is a base plate 158 to which and to the rear support plate 30, parallel vertical plates 159 are secured by means of angle irons 160 and 161. Between the vertical plates 159 is secured a housing 162 for the worm 35 and for a drum gear 163 meshing with this drum. Mounted in the worm gear is a transversely extending shaft 164 having its ends mounted in outbearings 165 secured to the angle irons 19. At each side of the plates 159, this shaft has mounted thereon a rope drum structure and drive therefor, more clearly shown in Figures 27, 28 and 29. Each rope drum structure includes a drum 166 rotatably mounted upon the shaft 164 and having formed upon its outer end a flange 167, a brake flange 168 engaged by the brake band 169 suitably controlled by a hand wheel 170. To the end flange 167 is likewise secured a sun gear 171 upon the hub 172 of which is rotatably mounted a second sun gear 173. The hub of the sun gear 173 has an outstanding flange 174, the end of which is provided with a braking flange 175 having coacting therewith a suitably controlled brake band 176. Secured to the shaft at the open side of the structure formed by the sun gear and its associated flanges is a disk 177 having mounted thereon at circumferentially spaced points gear units 178, each including a planet gear 179 meshing with the sun gear 171 and a second planet gear 180 meshing with the sun gear 173. It will be obvious that upon braking of the sun gear structure 173 through its associated brake 176, the planetary train is brought into operation and the drum will be driven at a reduced speed. Means are also provided for locking this drum to the shaft for rotation therewith so that a second and higher speed of the drum is provided. This means may take any suitable form and in the present instance is illustrated as including a shifting collar 181 mounted upon the shaft 164 outwardly of the disk 177. This collar has dogging teeth 182 extending into corresponding openings 183 formed in the disk 177. The sun gear is provided with corresponding openings 184 so that when the collar 181 is shifted toward the drum, the ends of the dogging teeth 182 will enter the openings 184 and lock the sun gear 171 and accordingly the drum 166 to the disk 177.

Engaged with each drum 166 is one end of a cable 185, the free end of which is passed beneath a guide pulley 186 secured to the forward end of the stationary base of the turntable, as more clearly shown in Figure 2ª and hence beneath the turntable and about inner and outer pulleys 187 and 188 carried by the rear portion of the stationary section of the turntable. From the outer pulley 188 which has its face projected slightly beyond the outer faces of the angle irons 19, the cable is led forwardly to the shovel at the front end of the machine. Rotatably mounted upon bases 189 carried by the shovel base plate 17 at opposite sides thereof are sheave mountings 190, each including a pair of rotatably mounted sheaves 191 and 192, the pivot of the sheave 192 being extended to form a pivotal mounting for the sheave mounting and engaging in an opening 193 formed in the base. The forward ends of the cables 185 are passed about one or the other of the sheaves of this block and when it is desired to move the machine, the ends of these cables are passed about a jack post 194 which is suitably located and the location of which will depend entirely upon the direction in which it is desired to move the machine. The connections employed with the jack post for advancing the machine and at the same time providing for a certain amount of transverse movement to permit the machine to be bodily shifted to cover the entire width of a cutting which is of greater width than the machine are generally indicated in Figure 33. It will be obvious that by simultaneously operating the drums, the machine may be advanced in a substantially straight path while by operating one of the other of the drums, the machine may be advanced and at the same time shifted to one side or the other.

It will be obvious that the surface upon which a machine of this character must operate is far from flat and that accordingly the machine if ofttimes subjected to considerable strain tending to rack the body. It is for this reason that the flexible couplings 50 and 43 are provided, it having been found in actual practice that unevenness of the surface places such strain upon the shafts 32 and 48 that such couplings are necessary. These couplings will take care of all but the most severe strain. It will be obvious, however, that on some occasions, in moving the machine a slight elevation intermediate the ends of the machine would cause considerable strain to be applied unless some means were provided to compensate therefor. Such a means I have generally designated at 195 (Figure 2ª) and consists as more clearly shown in Figures 33 and 34 of a U-shaped upper shoe 196, the arms of which slidably abut the outer faces of the angle irons 19 and the bight portion of which extends beneath the conveyer base and flatly engages against the horizontal flanges of the angle irons. This upper shoe is held against longitudinal movement by the heads of securing elements employed for attaching the turntable base to the angle irons, these securing elements having their heads engaged in vertical slots 197 formed in and opening through the upper ends of the arms so that in order to apply or remove this upper shoe, it is merely necessary to elevate the rear end of the machine sufficiently to permit such application or removal.

Securely bolted to the outer face of each arm is a raising shoe 198 comprising a block of metal having in its end edges vertically extending channels 199 and provided centrally with a vertical bore 200 which is intercepted midway of the block by a transverse slot 201. Sliding shoes 202 are provided comprising flat sheets of relatively thick metal having their ends upturned, as at 203. With these shoes are engaged guide pins 204 which extend vertically through the channels 199 in the end edges of the raising shoe 198. Directed through the bore 200 of the raising shoe is a jack screw 205 which passes through a nut mounted in and held against movement by the walls of the slot 201. The lower end of this screw abuts the upper face of the sliding shoe while the upper end thereof is provided with suitable means, as at 206, whereby it may be rotated. It will be obvious that by operating these screws, any unevenness as by a change of the angle of the surface between the front and rear ends of the machine, may be compensated for.

In the operation of the machine, it is possible by manipulation of the clutch element 26 to disconnect both the forward conveyer 11 and middle conveyer 12 while leaving the rear conveyer in operation, while by operating the clutch element 41, the rear conveyer may be disconnected while the front and middle conveyers are left in operation. When the machine is to be shifted, both clutch elements 26 and 41 are disengaged so that the entire power provided by the motor may be employed in this shifting operation. Attention is directed to the fact that while all of the conveyer elements are disconnected from the motor, while this motor is in operation, the shaft 32 is in continuous operation and this shaft has been continued beyond the rear end of the stationary element of the turntable sufficiently to admit access thereto and there provided with a squared end portion 32ª admitting the drive take-off for operating other mechanism such as a supporting truck upon which the machine is arranged or other devices.

It will be obvious that the machine may be shifted to one side or the other to cover the entire width of a relatively wide seam and at the same time flexibility of the rear conveyer will admit of this conveyer discharging to mine cars located upon a track arranged at either side of the conveyer. An idea of the size of the machine and its possibilities as a flexible conveyer may be had when it is pointed out that a machine as illustrated in the accompanying drawings in actual construction has a maximum height of thirty inches occurring at the middle conveyer and a length of approximately seventeen feet with the conveyers aligned, while with the rear conveyer at right angles, the length is but thirteen feet, thus permitting the machine to be turned. As the machine is operated, practically at all times with the rear conveyer at right angles, it will be obvious that it is particularly suited for operation in the cramped quarters afforded in mine work.

It will be obvious that this structure is capable of a considerable range of change and modification without materially departing from the spirit of my invention and I accordingly do not limit myself to the specific structure hereinbefore set forth except as hereinafter claimed.

I claim:—

1. In a loading machine of the type described, a stationary conveyer structure, a movable conveyer strutcure, a drive for the conveyer of the stationary conveyer structure, a connection between the drive and the conveyer of the movable conveyer structure permitting rotation of the movable conveyer structure about a vertical axis through 180° and adjustment of the movable conveyer structure about a horizontal axis in any position of the conveyer about its vertical axis, including a turntable upon which the movable conveyer is mounted, a gear axial to the turntable, a turntable base having mounted therein a shaft continuously driven from the drive, a pinion on the shaft meshing with the gear and connectible to the shaft to be driven thereby, a horizontal shaft operatively connected with said gear to be driven thereby, bearings for said horizontal shaft, and a mounting for the movable conveyer rotatably engaged with the bearings of the horizontal shaft.

2. In a loading machine of the type described, a base, a stationary elevating conveyer structure mounted upon the base, a movable conveyer structure into which the stationary conveyer structure discharges and likewise mounted upon the base, a loading device for the elevating conveyer structure, a common drive for the conveyers of said conveyer structure and for said loading device including means operable to disconnect the driving connections of the elevating conveyer and the loading apparatus, a second connection operable to disconnect the conveyer of the movable conveyer structure and means for bodily shifting the base including cable drums independently connectible with said drive at all times during operation of the drive.

3. A movable conveyer mounting including a turntable base, a horizontal drive shaft mounted in the base, a turntable mounted on the base, horizontal bearings carried by the turntable, a conveyer structure mounted upon said bearings for adjustment in a vertical plane, means operatively connecting the conveyer structure and turntable for adjusting the conveyer about said turntable bearings as an axis and means for connecting said drive shaft to the conveyer of the conveyer structure.

4. A movable conveyer mounting including a turntable base, a horizontal drive shaft mounted in the base, a turntable mounted on the base, horizontal bearings carried by the turntable, a conveyer structure mounted upon said bearings for adjustment in a vertical plane, means operatively connecting the conveyer structure and turntable for adjusting the conveyer about said turntable bearings as an axis, means for connecting said drive shaft to the conveyer of the conveyer structure including a shaft mounted in said bearings and driven from said drive shaft.

5. A movable conveyer mounting including a turntable base, a horizontal drive shaft mounted in the base, a turntable mounted on the base, horizontal bearings carried by the turntable, a conveyer structure including brackets having bearings rotatably engaging the bearings of said turntable, a second shaft mounted in said brackets, oscillatable foot bearings carried by the turntable, gears rotatably supported by the bearings and forming worm nuts, worms mounted in said worm nuts and having yokes at their upper ends engaging said shaft and means for simultaneously rotating said gears.

6. A movable conveyer mounting including a turntable base, a horizontal drive shaft mounted in the base, a turntable mounted on the base, horizontal bearings carried by the turntable, a conveyer structure including brackets having bearings rotatably engaging the bearings of said turntable, a second shaft mounted in said bearings, oscillatable foot bearings carried by the turntable, gears rotatably supported by the bearings and forming worm nuts, worms mounted in said worm nuts and having yokes at their upper ends engaging said shaft, means for simultaneously rotating said gears. said brackets having a further shaft mounted therein and constituting a drive shaft for the conveyer of the conveyer structure, a third shaft rotatably mounted in the bearings of said turntable having driven engagement with the horizontal shaft of the turntable base, a driving connection between said second and third shafts and idler rollers for the conveyer of the conveyer structure carried by the first and third shafts.

7. In combination, a conveyer structure including flight chains, brackets secured to the opposite sides of said conveyer structure having bearings for three parallel shafts, said shafts including a drive and idler shafts, the drive shaft being arranged between the idler shafts and having sprockets to engage the flight chain and idlers upon the idler shaft aligning with said sprockets.

8. In combination, a conveyer structure including flight chains, brackets secured to the opposite sides of said conveyer structure having bearings for three parallel shafts, said shafts including a drive and idler shafts, the drive shaft being arranged between the idler shafts and having sprockets to engage the flight chain and idlers upon the idler shaft aligning with said sprockets, one of said idler shafts being stationary and a support for the conveyer structure engaging the stationary shaft.

9. In combination, a conveyer structure including flight chains, brackets secured to the opposite sides of said conveyer structure having bearings for three parallel shafts, said shafts including a drive and idler shafts, the drive shaft being arranged between the idler shafts and having sprockets to engage the flight chain and idlers upon the idler shaft aligning with said sprockets, one of said idler shafts being rotatable and having driving engagement with said drive shaft and means for driving said idler shaft.

10. In combination, a conveyer structure including flight chains, brackets secured to the opposite sides of said conveyer structure having bearings for three parallel shafts, said shafts including a drive and idler shafts, the drive shaft being arranged between the idler shafts and having sprockets to engage the flight chain and idlers upon the idler shaft aligning with said sprockets, one of said idler shafts being rotatable and having driving engagement with said drive shaft, means for driving said idler shaft, the other of said idler shafts being stationary and a support for the conveyer structure engaging the stationary shaft.

11. In a loading conveyer, a base having a shovel at its forward end including diverging plates one of which is secured to and forms a portion of the base, a motor deck secured to the base, a motor on the deck, said deck being spaced from said shovel, a stationary conveyer structure including horizontal and inclined sections, the inclined section having its lower forward end directed between the plates of the shovel, a supporting shaft for the forward end of the conveyer secured to the base at the lower plate of the shovel, the horizontal section of said conveyer closely overlying the upper surface of said motor, supporting plates secured to opposite ends of the deck plate and extending upwardly and forming supports for the conveyer structure, conveyers mounted upon the upper plate of said shovel and a common drive for the conveyer of the conveyer structure and for the conveyers of the shovel structure.

12. In a loading machine of the type described, a base, a stationary elevating conveyer structure mounted upon the base, a movable conveyer structure into which the stationary conveyer structure discharges and likewise mounted upon the base, a loading device for the elevating conveyer structure, a common drive for the conveyers of said conveyer structures and for said loading device and means for bodily shifting the base longitudinally or transversely and connectible with said drive.

13. In a loading machine of the type described, a base, a stationary elevating conveyer structure mounted upon the base, a movable conveyer structure into which the stationary conveyer structure discharges and likewise mounted upon the base, a loading device for the elevating conveyer structure, a common drive for the conveyers of said conveyer structures and for said loading device, means for bodily shifting the base longitudinally or transversely and connectible with said drive and including cable drums carried by the base independently connectible with the drive, cables on said drums, guide pulleys for said cables carried by the base at each side of the base and at opposite ends thereof and anchors with which the cables are engaged.

14. A movable conveyer mounting including a turnable base, a horizontal drive shaft mounted in the base, a turntable mounted on the base, horizontal bearings carried by the turntable, a conveyer structure mounted upon said bearings for adjustment in a vertical plane, means operatively connecting the conveyer structure and turntable for adjusting the conveyer about said bearings as an axis, means for connecting said drive to the conveyer of the conveyer structure including a shaft mounted in said bearings and driven from said drive shaft, a shaft supported from the conveyor structure and having sprockets engaging the conveyer of the conveyer structure to drive the same and a driving connection between the last named shaft and the shaft mounted in said bearings.

15. In combination, a conveyer structure including flight chains, brackets secured to the opposite sides of said conveyer structure having bearings for three parallel shafts, said shafts including a drive and idler shafts, the drive shaft being arranged between the idler shafts and having sprockets to engage the flight chain and idlers upon the idler shaft aligning with said sprockets, one of said idler shafts being stationary and a longitudinally adjustable support for the conveyer structure engaging the stationary shaft.

16. In a loading conveyer, a base having a shovel at its forward end including rearwardly diverging plates one of which is horizontal and forms a portion of the base, an elevating conveyer associated with the base and having at its forward end an inclining section projecting between the plates of the shovel and supported from the base between said plates, the upper plate of the shovel having a notch and conveyers mounted upon the upper plate of the shovel at opposite sides of the shovel and delivering material to the space therebetween and to said notch.

17. In a loading conveyer, a base having a shovel at its forward end including rearwardly diverging plates one of which is horizontal and forms a portion of the base, an elevating conveyer associated with the base and having at its forward end an inclining section projecting between the plates of the shovel and supported from the base between said plates, the upper plate of the shovel having a notch, conveyers mounted upon the upper plate of the shovel at opposite sides of the shovel and delivering material to the space therebetween and to said notch, each of said conveyers including a drive shaft and a drive connecting the drive shafts including a worm gear secured to each of the drive shafts and a transversely extending shaft having worms at its ends for engagement with the worm gears of said drive shafts.

18. In a loading conveyer, a base having a shovel at its forward end including rearwardly diverging plates one of which is horizontal and forms a portion of the base, an elevating conveyer associated with the base and having at its forward end an inclining section projecting between the plates of the shovel and supported from the base between said plates, the upper plate of the shovel having a notch, conveyers mounted upon the upper plate of the shovel at opposite sides of the shovel and delivering material to the space therebetween and to said notch, each of said conveyers including a drive shaft, a drive connecting the drive shafts including a worm gear secured to each of the drive shafts, a transversely extending shaft having worms at its ends for engagement with the worm gears of said drive shafts and a housing for the drive shaft, worm and worm gear of each conveyer structure rigidly connecting the plates of said shovel.

19. In a loading conveyer, a base having a shovel at its forward end including rearwardly diverging plates one of which is horizontal and forms a portion of the base, an elevating conveyer associated with the base and having at its forward end an inclining section projecting between the plates of the shovel and supported from the base between said plates, the upper plate of the shovel having a notch, conveyers mounted upon the upper plate of the shovel at opposite sides of the shovel and delivering material to the space therebetween and to said notch, each of said conveyers including a drive shaft, a drive connecting the drive shafts including a worm gear secured to each of the drive shafts, a transversely extending shaft having worms at its ends for engagement with the worm gears of said drive shafts and a housing for the drive shaft, worm and worm gear of each conveyer structure rigidly connecting the plates of said shovel, the forward end of the shovel consisting of a shoe with which the base plate of the shovel is rigidly connected, the upper plate of said shovel having at its forward edge an aligning plate loosely engaging in a transversely extending groove formed in said shoe.

20. In a conveyer, a base, a motor deck supported from the base, a motor on the deck, a conveyer structure extending immediately above the motor and supports for said conveyer structure secured to the ends of the motor deck and forming end walls of a motor compartment.

21. In a loading machine of the type described, a base, a stationary elevating conveyer structure mounted upon the base, a movable conveyer structure into which the stationary conveyer structure discharges and likewise mounted upon the base, a loading device for the elevating conveyer structure, a common drive for the conveyers of said conveyer structure and for said loading device including a shaft extending transversely of the base and having driving connections with said elevating conveyer and the loading device therefor, a second shaft extending longitudinally of the base and connectible with the movable conveyer to operate the same, a member rotatable upon the first named shaft and having continuous driving engagement with the second shaft, means for rotating said member and means for clutching said member to the first named shaft.

22. In a loading machine of the type described, a base, a stationary elevating conveyer structure mounted upon the base, a movable conveyer structure into which the stationary conveyer structure discharges and likewise mounted upon the base, a loading device for the elevating conveyer structure, a common drive for the conveyers of said conveyer structure and for said loading device including a shaft extending transversely of the base and having driving connections with said elevating conveyer and the loading device therefor, a second shaft extending longitudinally of the base and connectible with the movable conveyer to operate the same, a member rotatable upon the first named shaft and having continuous driving engagement with the second shaft, means for rotating said member and means for clutching said member to the first named shaft whereby the second named shaft is continuously driven during operation of such means for rotating said member, a third shaft continuously driven from said second shaft, cable drums carried by said shaft and transmission mechanism for independently connecting the cable drums to said third shaft.

23. In a loading machine of the type described, a base slidable upon the ground, conveyer mechanism and loading apparatus therefor carried by the base, a drive for the conveyer mechanism, means for causing the base to slide upon the ground carried by the base and operable from the drive of the conveyer mechanism and means for vertically adjusting one end of the base including a part slidably engaging the ground.

24. In a conveyer, a base, a motor deck supported from the base, a motor on the deck, a conveyer structure extending immediately above the motor, supports for said conveyer structure secured to the ends of the motor deck and forming end walls of a compartment for the motor, bearings carried by said motor deck, a shaft rotatable in the bearings and having driving connection with the conveyer of the conveyer structure and a driving connection between the motor and the shaft.

25. In a conveyer, a base, a motor deck supported from the base, a motor on the deck, a conveyer structure extending immediately above the motor, supports for said conveyer structure secured to the ends of the motor deck and forming end walls of a compartment for the motor, bearings carried by said motor deck, a shaft rotatable in the bearings and having driving connection with the conveyer of the conveyer structure and a driving connection between the motor and the shaft including a member rotatable upon said shaft and a clutch for connecting the member to the shaft.

26. In a conveyer, a base, a motor deck supported from the base, a motor on the deck, a conveyer structure extending immediately above the motor, supports for said conveyer structure secured to the ends of the motor deck and forming end walls of a compartment for the motor, bearings carried by said motor deck, a shaft rotatable in the bearings and having driving connection with the conveyer of the conveyer structure, a driving connection between the motor and shaft including a member rotatable upon said shaft, a clutch for connecting the member to the shaft and a take-off drive including a bearing carried by one of said supports, a shaft mounted in the bearing and projecting into the motor compartment and meshing gears upon said member and shaft whereby the last named shaft is continuously driven during operation of the motor.

In testimony whereof I hereunto affix my signature.

CHARLES W. SHANABERGER.